(12) United States Patent
Saito et al.

(10) Patent No.: US 8,357,436 B2
(45) Date of Patent: *Jan. 22, 2013

(54) LIQUID CRYSTAL COMPOSITION AND LIQUID CRYSTAL DISPLAY DEVICE

(75) Inventors: Masayuki Saito, Chiba (JP); Norikatsu Hattori, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 13/060,053

(22) PCT Filed: Aug. 25, 2009

(86) PCT No.: PCT/JP2009/064749
§ 371 (c)(1), (2), (4) Date: Feb. 21, 2011

(87) PCT Pub. No.: WO2010/032587
PCT Pub. Date: Mar. 25, 2010

(65) Prior Publication Data
US 2011/0147658 A1 Jun. 23, 2011

(30) Foreign Application Priority Data
Sep. 17, 2008 (JP) .................... 2008-237448

(51) Int. Cl.
*C09K 19/34* (2006.01)
*C09K 19/30* (2006.01)
*C09K 19/32* (2006.01)
*C09K 19/12* (2006.01)
*C09K 19/20* (2006.01)

(52) U.S. Cl. ............... 428/1.1; 252/299.61; 252/299.62; 252/299.63; 252/299.66; 252/299.67

(58) Field of Classification Search ............ 252/299.01, 252/299.5, 299.7, 299.61, 299.62, 299.63, 252/99.66, 299.67; 349/115; 428/1.1
See application file for complete search history.

(56) References Cited

U.S. PATENT DOCUMENTS

| | | | | |
|---|---|---|---|---|
| 7,767,278 B2 * | 8/2010 | Kibe et al. | ...................... | 428/1.1 |
| 7,767,279 B2 * | 8/2010 | Hattori et al. | ................... | 428/1.1 |
| 7,914,862 B2 * | 3/2011 | Masukawa | ..................... | 428/1.1 |
| 8,158,219 B2 * | 4/2012 | Hattori et al. | ................... | 428/1.1 |
| 8,211,332 B2 * | 7/2012 | Hattori et al. | .............. | 252/299.6 |
| 2008/0230746 A1 * | 9/2008 | Kibe et al. | .............. | 252/299.61 |
| 2008/0303001 A1 * | 12/2008 | Hattori et al. | ............ | 252/299.61 |
| 2011/0248215 A1 * | 10/2011 | Yamashita et al. | ....... | 252/299.61 |

FOREIGN PATENT DOCUMENTS

| | | |
|---|---|---|
| JP | 2000-008040 | 1/2000 |
| JP | 2001-115161 | 4/2001 |
| JP | 2001-262145 | 9/2001 |
| JP | 2006-037053 | 2/2006 |
| JP | 2007-254583 | 10/2007 |
| WO | 2008114779 | 9/2008 |
| WO | 2008114821 | 9/2008 |

* cited by examiner

*Primary Examiner* — Shean C Wu
(74) *Attorney, Agent, or Firm* — J.C. Patents

(57) ABSTRACT

The subject is to provide a liquid crystal composition that satisfies at least one characteristic of characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light and a high stability to heat, or that is suitably balanced regarding two characteristics thereof. The subject is to provide an AM device that has a short response time, a large voltage holding ratio, a large contrast ratio, a long service life and so forth.

The invention provides a liquid crystal composition having a negative dielectric anisotropy that includes a specific compound having 1-pyran-2,5-dyil as a first component, and a specific compound having a negatively large dielectric anisotropy as a second component, and provides a liquid crystal display device containing the composition.

20 Claims, No Drawings

LIQUID CRYSTAL COMPOSITION AND LIQUID CRYSTAL DISPLAY DEVICE

BACKGROUND OF THE INVENTION

1. Field of the Invention

The invention relates to a liquid crystal composition suitable for use in an active matrix (AM) device, and an AM device containing the composition. More specifically, the invention relates to a liquid crystal composition having a negative dielectric anisotropy, and also relates to a device of an in plane switching (IPS) mode, a vertical alignment (VA) mode or a polymer sustained alignment (PSA) mode containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), polymer sustained alignment (PSA) and so forth. Classification based on a driving mode of the device includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to the temperature range in which the device can be used. A desirable maximum temperature of the nematic phase is 70° C. or more and a desirable minimum temperature is −10° C. or less. The viscosity of the composition relates to the response time of the device. The rotation viscosity of the composition also relates to the response time of the device. A short response time is desirable for displaying a moving image. Accordingly, a small viscosity of the composition is desirable. A small viscosity at a low temperature is more desirable.

TABLE 1

General Characteristics of Liquid
Crystal Composition and AM Device

| No | General Characteristics of a Composition | General Characteristics of an AM Device |
|---|---|---|
| 1 | Temperature range of a nematic phase is wide | Usable temperature range is wide |
| 2 | Viscosity is small1) | Response time is short |
| 3 | Optical anisotropy is suitable | Contrast ratio is large |
| 4 | Dielectric anisotropy is positively or negatively large | Threshold voltage is low, electric power consumption is small, and contrast ratio is large |
| 5 | Specific resistance is large | Voltage holding ratio is large, and a contrast ratio is large |

TABLE 1-continued

General Characteristics of Liquid
Crystal Composition and AM Device

| No | General Characteristics of a Composition | General Characteristics of an AM Device |
|---|---|---|
| 6 | It is stable to ultraviolet light and heat | Service life is long |

1)A liquid crystal composition can be injected into a cell in a shorter period of time.

The optical anisotropy of the composition relates to the contrast ratio of the device. A product (Δn×d) of the optical anisotropy (Δn) of the composition and the cell gap (d) of the device is designed to maximize the contrast ratio. A suitable value of the product depends on the kind of operation mode. In a device having a VA mode, a suitable value is in a range of from 0.30 μm to 0.40 μm, and in a device having an IPS mode, a suitable value is in a range of from 0.20 μm to 0.30 μm. In this case, a composition having a large optical anisotropy is desirable for a device having a small cell gap. A large dielectric anisotropy of the composition contributes to a low threshold voltage, a small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life. These characteristics are desirable for an AM device used in a liquid crystal projector, a liquid crystal television and so forth.

In an AM device having a TN mode, a composition having a positive dielectric anisotropy is used. In an AM device having a VA mode, a composition having a negative dielectric anisotropy is used. In an AM device having an IPS mode, a composition having a positive or negative dielectric anisotropy is used. In an AM device having a PSA mode, a composition having a positive or negative dielectric anisotropy is used.

Examples of the liquid crystal composition having a negative dielectric anisotropy are disclosed in the following patent documents:
No. 1: JP 2001-262145 A; No. 2: JP 2001-115161 A.

A desirable AM device has characteristics such as a wide usable temperature range, a short response time, a high contrast ratio, a low threshold voltage, a large voltage holding ratio, a long service life, and so forth. A shorter response time is desirable by even one millisecond. Thus, a composition having characteristics such as a high maximum temperature of a nematic phase, a low minimum temperature of a nematic phase, a low viscosity, a suitable optical anisotropy, positively or negatively a large dielectric anisotropy, a large specific resistance, a high stability to ultraviolet light, a high stability to heat, and so forth is especially desirable.

One of the advantages of the invention is to provide a liquid crystal composition that satisfies at least one of characteristic such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat and so forth. Another advantage of the invention is to provide a liquid crystal composition that is properly balanced regarding at least two of characteristics. A further advantage of the invention is to provide a liquid crystal display device that contains the liquid crystal composition. An additional advantage of the invention is to provide a liquid crystal composition that has a large optical anisotropy, a large dielectric anisotropy, a high stability to ultraviolet light and so forth, and is to provide an AM device that has a short response time, a large voltage holding ratio, a large contrast ratio, a long service life and so forth.

SUMMARY OF THE INVENTION

The invention concerns a liquid crystal composition having a negative dielectric anisotropy that includes two components, wherein a first component is at least one compound selected from the group of compounds represented by formula (1), the second component is at least one compound selected from the group of compounds represented by formula (2), and concerns a liquid crystal display device including the composition:

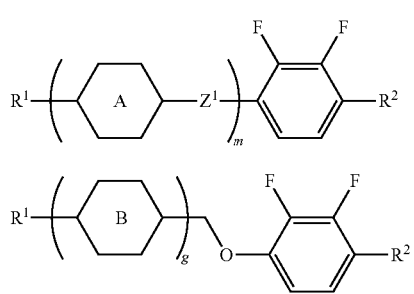

wherein R1 and R2 are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A is independently 1-pyran-2,5-diyl, 1,4-cyclohexylene or 1,4-phenylene, at least one ring A is 1-pyran-2,5-dyil; ring B is independently 1,4-cyclohexylene or 1,4-phenylene; Z1 is independently a single bond, ethylene, methyleneoxy or carbonyloxy; and m and g are each independently 1, 2 or 3. The invention also concerns a liquid crystal display device that includes the liquid crystal composition, and so forth.

DETAILED DESCRIPTION OF THE INVENTION

The terms used in the specification and claims are defined as follows. The liquid crystal composition and the liquid crystal display device of the invention may occasionally be expressed simply as "the composition" and "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains, for example, a 6-membered ring such as 1,4-cyclohexylene and 1,4-phenylene, and a rod like molecular structure. An optically active compound or a polymerizable compound may occasionally be added to the composition. Even in the case where the compound is a liquid crystal compound, the compound is classified as an additive herein. At least one compound selected from a group of compounds represented by formula (1) may be abbreviated to "the compound (1)." The "compound (1)" means one compound or two or more compounds represented by formula (1). The same rules apply to compounds represented by the other formulas. "Arbitrary" is used not only in cases when the position is arbitrary but also in cases when the number is arbitrary. However, it is not used in cases when the number is 0 (zero).

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also nearly at the maximum temperature of a nematic phase in the initial stage, the composition has a large specific resistance at room temperature and also nearly at the maximum temperature of a nematic phase even after it has been used for a long time. "A voltage holding ratio is large" means that a device has a large voltage holding ratio at room temperature and also nearly at the maximum temperature of a nematic phase in the initial stage, the device has a large voltage holding ratio at room temperature and also nearly at the maximum temperature of a nematic phase even after it has been used for a long time. In the description of the characteristics such as optical anisotropy, the characteristics of the composition such as the optical anisotropy and so forth are values measured in the methods disclosed in Examples. A first component means one compound, or two or more compounds. "A ratio of the first component" means the percentage by weight (% by weight) of the first component based on the total weight of liquid crystal composition. The same rule applies to the ratio of a second component and so forth. A ratio of an additive mixed with the composition means the percentage by weight (% by weight) based on the total weight of liquid crystal composition.

The symbol R1 is used for a plurality of compounds in the chemical formulas of component compounds. The meanings of R1 may be identical or different in two arbitrary compounds among these. In one case, for example, R1 of the compound (1) is ethyl and R1 of the compound (2) is ethyl. In another case, R1 of the compound (1) is ethyl and R1 of the compound (2) is propyl. This rule also applies to the symbols R2, Z1 and so forth.

The invention has the following features.

1. The invention concerns a liquid crystal composition having a negative dielectric anisotropy that includes two components, wherein the first component is at least one compound selected from the group of compounds represented by formula (1), the second component is at least one compound selected from the group of compounds represented by formula (2):

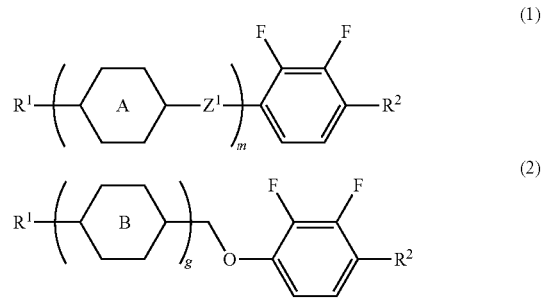

wherein R1 and R2 are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A is independently 1-pyran-2,5-diyl, 1,4-cyclohexylene or 1,4-phenylene, at least one ring A is 1-pyran-2,5-dyil; ring B is independently 1,4-cyclohexylene or 1,4-phenylene; Z1 is independently a single bond, ethylene, methyleneoxy or carbonyloxy; and m and g are each independently 1, 2 or 3.

2. The liquid crystal composition according to item 1, wherein the first component is at least one compound selected from the group of compounds represented by formula (1-1) to (1-6):

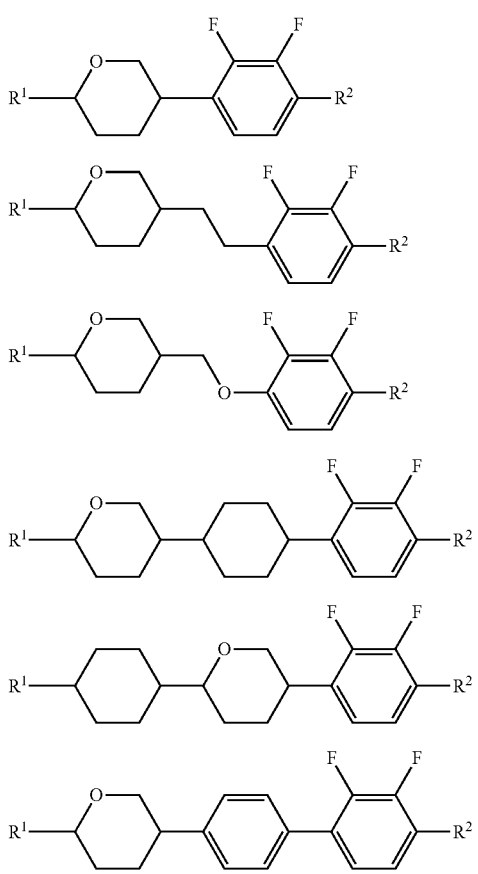

wherein R1 and R2 are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to item 2, wherein the first component is at least one compound selected from the group of compounds represented by formula (1-1) to (1-3).

4. The liquid crystal composition according to item 2, wherein the first component is at least one compound selected from the group of compounds represented by formula (1-4) to (1-6).

5. The liquid crystal composition according to item 2, wherein the first component is a mixture of at least one compound selected from the group of compounds represented by formula (1-1) to (1-3), and at least one compound selected from the group of compounds represented by formula (1-4) to (1-6).

6. The liquid crystal composition according to any one of items 1 to 5, wherein the second component is at least one compound selected from the group of compounds represented by formula (2-1) to (2-2):

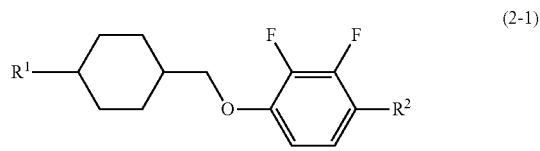

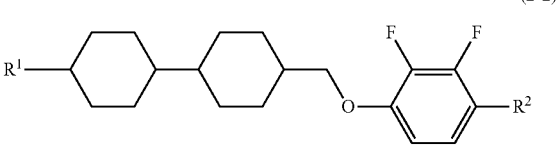

wherein R1 and R2 are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

7. The liquid crystal composition according to item 6, wherein the second component is at least one compound selected from the group of compounds represented by formula (2-1).

8. The liquid crystal composition according to item 6, wherein the second component is at least one compound selected from the group of compounds represented by formula (2-2).

9. The liquid crystal composition according to item 6, wherein the second component is a mixture of at least one compound selected from the group of compounds represented by formula (2-1) and at least one compound selected from the group of compounds represented by formula (2-2).

10. The liquid crystal composition according to any one of items 1 to 9, wherein the ratio of the first component is from 5% by weight to 50% by weight, and the ratio of the second component is from 5% by weight to 50% by weight, based on the total weight of liquid crystal composition.

11. The liquid crystal composition according to any one of items 1 to 10, which further contains at least one compound selected from the group of compounds represented by formula (3) as a third component.

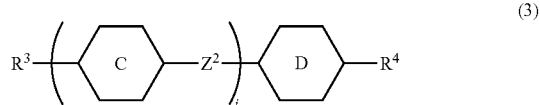

wherein R3 and R4 are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring C and ring D are each independently 1,4-cyclohexylene,1,4-phenylene, 2-fluoro-1,4-phenylene,3-fluoro-1,4-phenylene or 2,5-difluoro-1,4-phenylene; Z2 is independently a single bond, ethylene, or carbonyloxy; j is 1, 2 or 3.

12. The liquid crystal composition according to item 11, wherein the third component is at least one compound selected from the group of compounds represented by formula (3-1) to (3-10):

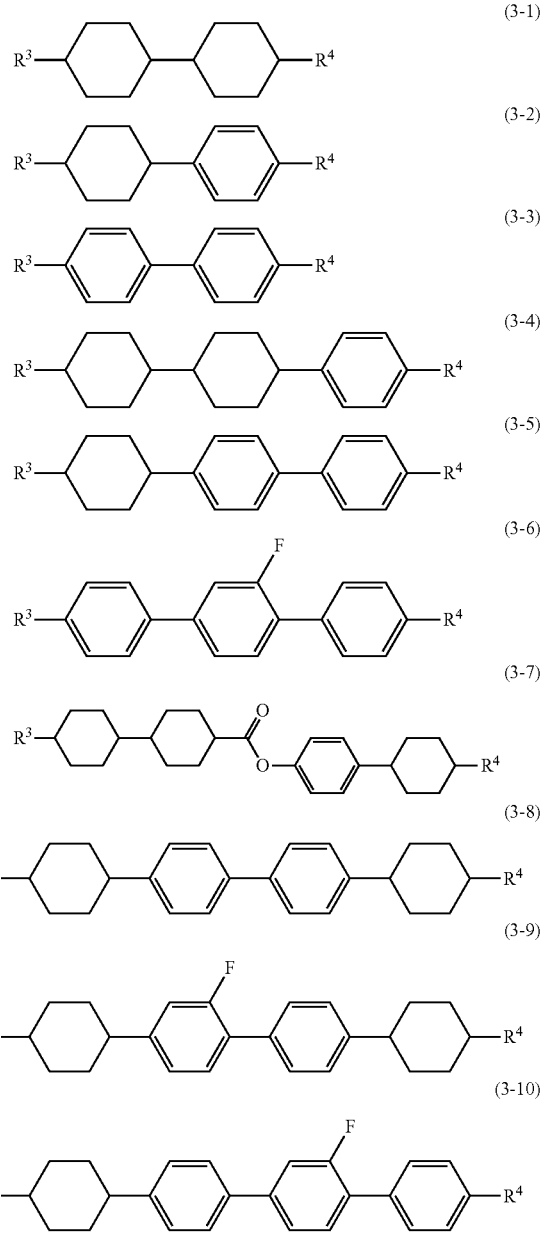

wherein R3 and R4 are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine.

13. The liquid crystal composition according to item 12, wherein the third component is at least one compound selected from the group of compounds represented by formula (3-1).

14. The liquid crystal composition according to item 12, wherein the third component is a mixture of at least one compound selected from the group of compounds represented by formula (3-1) and at least one compound selected from the group of compounds represented by formula (3-4).

15. The liquid crystal composition according to item 12, wherein the third component is a mixture of at least one compound selected from the group of compounds represented by formula (3-6) and at least one compound selected from the group of compounds represented by formula (3-10).

16. The liquid crystal composition according to item 12, wherein the third component is a mixture of at least one compound selected from the group of compounds represented by formula (3-1), at least one compound selected from the group of compounds represented by formula (3-4)and at least one compound selected from the group of compounds represented by formula (3-6).

17. The liquid crystal composition according to any one of items 11 to 16, wherein a ratio of the third component is from 30% by weight to 70% by weight based on the total weight of the liquid crystal composition.

18. The liquid crystal composition according to any one of items 1 to 17, wherein the fourth component is at least one compound selected from the group of compounds represented by the formula (4-1) to (4-2):

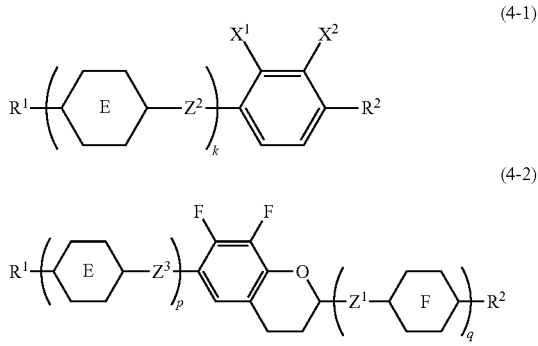

wherein R1 and R2 are each independently alkyl having 1 to 12 carbons, alkoxy having 1 to 12 carbons, alkenyl having 2 to 12 carbons or alkenyl having 2 to 12 carbons; ring E and ring F are each independently 1,4-cyclohexylene or 1,4-phenylene; Z1 and Z3 are each independently a single bond, ethylene, methyleneoxy, or carbonyloxy; Z2 is independently a single bond, ethylene or carbonyloxy; X1 and X2 are each independently fluorine or chlorine; k is 1, 2 or 3; p and q are each independently 0, 1, 2 or 3, and the sum of p and q is 3 or less.

19. The liquid crystal composition according to item 18, wherein the fourth component is at least one compound selected from the group of compounds represented by the formulas (4-1-1) to (4-1-7) and (4-2-1) to (4-2-4):

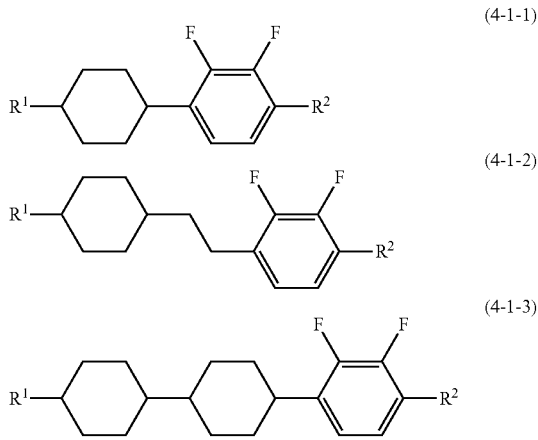

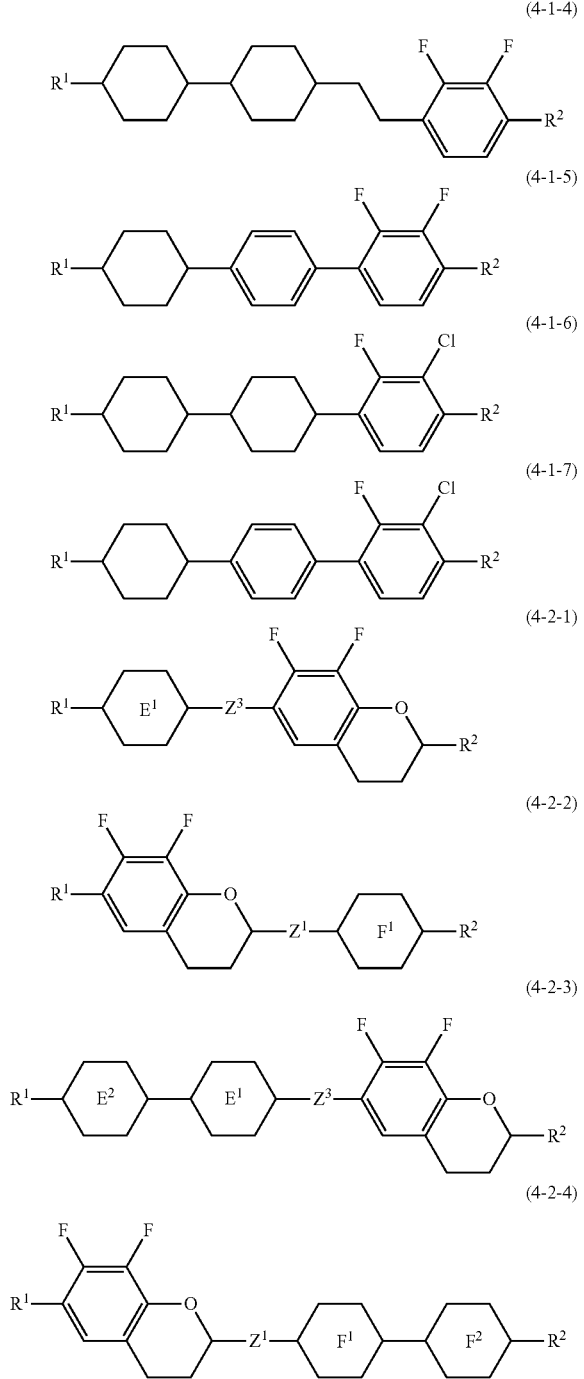

wherein R1 and R2 are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring E1, ring E2, ring F1 and ring F2 are each independently 1,4-cyclohexylene or 1,4-phenylene; Z1 and Z3 are each independently a single bond, ethylene, methyleneoxy or carbonyloxy.

20. The liquid crystal composition according to item 19, wherein the fourth component is at least one compound selected from the group of compounds represented by formula (4-1-1)

21. The liquid crystal composition according to item 19, wherein the fourth component is at least one compound selected from the group of compounds represented by formula (4-1-1), and at least one compound selected from the group of compounds represented by formula (4-1-5).

22. The liquid crystal composition according to any one of items 18 to 21, wherein a ratio of the fourth component is from 5% by weight to 50% by weight, based on the total weight of the liquid crystal composition.

23. The liquid crystal composition according to any one of items 1 to 22, wherein the composition has a maximum temperature of a nematic phase of 70° C. or more, an optical anisotropy (25° C.) at a wavelength of 589 nm of 0.08 or more, and a dielectric anisotropy (25° C.) at a frequency of 1 kHz of −2 or less.

24. A liquid crystal device display that includes the liquid crystal composition according to any one of items 1 to 23.

25. The liquid crystal composition according to item 24, wherein the liquid crystal display device has an operation mode of a VA mode, an IPS mode or a PSA mode, and has a driving mode of an active matrix mode.

The invention further includes: (1) the composition described above, wherein the composition further contains an optically active compound; (2) the composition described above, wherein the composition further contains an additive, such as an antioxidant, an ultraviolet light absorbent, an antifoaming agent, a polymerizable compound, a polymerization initiator and so forth; (3) an AM device containing the composition described above; (4) a device having a TN, ECB, OCB, IPS, VA or PSA mode, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, combinations of components in the composition, desirable ratios of the component compounds and the basis thereof will be explained. Fourth, a desirable embodiment of the component compounds will be explained. Fifth, examples of the component compound will be shown. Sixth, additives that may be added to the composition will be explained. Seventh, the preparation methods of the component compound will be explained. Lastly, use of the composition will be explained.

First, the constitution of component compounds in the composition will be explained. The composition of the invention is classified into the composition A and the composition B. The composition A may further contain other compounds such as another liquid crystal compound, an additive, an impurity, and so forth. "Another liquid crystal compound" is different from the compound (1), the compound (2), the compound (3), the compound (4-1) and the compound (4-2). Such a liquid crystal compound is mixed with the composition for the purpose of adjusting the characteristics of the composition. Among the other liquid crystal compounds, an amount of a cyano compound is desirably small from the viewpoint of stability to heat or ultraviolet light. The more desirable amount of a cyano compound is 0% by weight. The additive includes an optically active compound, an antioxidant, an ultraviolet light absorbent, a coloring matter, an antifoaming agent, a polymerizable compound, a polymerization initiator and so forth. The impurity is a compound and so forth contaminated in the process such as the synthesis of a component compound and so forth. Even when the compound is a liquid crystal compound, it is classified into an impurity herein.

The composition B essentially consists of the compounds selected from the compound (1), the compound (2), the compound (3) the compound (4-1) and the compound (4-2). The term "essentially" means that the composition does not contain a liquid crystal compound that is different from these compounds, except for the additive and the impurity. The components of the composition B are fewer than those of the composition A. The composition B is preferable to the composition A from the viewpoint of cost reduction. The composition A is preferable to the composition B, because characteristics of the composition A can be further adjusted by mixing other liquid crystal compounds.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols L, M and S are classification based on qualitative comparison among the component compounds. 0 (zero) of dielectric anisotropy means that "a value of dielectric anisotropy is not positively or negatively large and is nearly zero."

TABLE 2

Characteristics of Compounds

| Compound | (1) | (2) | (3) | (4) |
|---|---|---|---|---|
| Maximum temperature | L | S-M | S | M |
| Viscosity | M | M-L | S | M |
| Optical anisotropy | M | S-M | S-M | M-L |
| Dielectric anisotropy | 0 | L | 0 | 0 |
| Specific resistance | L | L | L | L |

1) The value of dielectric anisotropy is negative, and the symbol indicates the absolute value.

The main effects of the component compounds on the characteristics of the composition upon mixing the component compounds in the composition are as follows. The compound (1) increases the absolute value of the dielectric anisotropy, and decreases the minimum temperature. The compound (2) increases the absolute value of the dielectric anisotropy, and increases the optical anisotropy. The compound (3) decreases the viscosity, or increases the maximum temperature. The compound (4-1) decreases the minimum temperature. The compound (4-2) increases the absolute value of dielectric anisotropy.

Third, combinations of components in the composition, desirable ratios of the component compounds and the basis thereof will be explained. Example of the combinations of the components in the composition is first component+second component, first component+second component+third component, first component+second component+fourth component, and first component+second component+third component+fourth component. Desirable combinations of components in the composition are first component+second component+third component, and first component+second component+third component+fourth component.

A desirable ratio of the first component is 5% by weight or more for increasing the absolute value of dielectric anisotropy, and is 50% by weight or less for decreasing the minimum temperature. A more desirable ratio is from 5% by weight to 45% by weight. A particularly desirable ratio is from 5% by weight to 40% by weight.

A desirable ratio of the second component is 5% by weight or more for increasing the absolute value of dielectric anisotropy, and is 50% by weight or less for decreasing the viscosity. A more desirable ratio is from 5% by weight to 40% by weight. A particularly desirable ratio is from 5% by weight to 35% by weight.

A desirable ratio of the third component is 30% by weight or more for decreasing the viscosity or increasing the maximum temperature, and is 70% by weight or less for increasing the absolute value of dielectric anisotropy. A more desirable ratio is from 35% by weight to 65% by weight. A particularly desirable ratio is from 40% by weight to 60% by weight.

A desirable ratio of the fourth component is 5% by weight or more for increasing the optical anisotropy, and is 50% by weight or less for decreasing the minimum temperature. A more desirable ratio is from 5% by weight to 45% by weight. A particularly desirable ratio is from 5% by weight to 40% by weight.

Fourth, a desirable embodiment of the component compound will be explained. R1, R2, R3 and R4 are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine.

Desirable R1 and R2 are each independently alkyl having 1 to 12 carbons for increasing the stability to ultraviolet light or heat, or is alkoxy having 1 to 12 carbons for increasing the absolute value of dielectric anisotropy. Desirable R3 and R4 are each independently alkyl having 1 to 12 carbons for increasing the stability to ultraviolet light or heat, or is alkenyl having 2 to 12 carbons for decreasing the minimum temperature.

Desirable alkyl is methyl, ethyl, propyl, butyl, pentyl, hexyl, heptyl, or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy, or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing a viscosity. A desirable configuration of —CH═CH— in these alkenyl depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, straight chained alkenyl is preferable to branched alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. More preferred examples thereof include 2,2-difluorovinyl and 4,4-difluoro-3-butenyl for decreasing the viscosity.

Ring A is independently 1-pyrane-2,5-diyl,1,4-cyclohexylene, or 1,4-phenylene, and at least one of ring A is 1-pyrane-2,5 diyl. Two rings A may be same or different from each other when m is 2 or 3. Desirable ring A is independently 1-pyrane-2,5-diyl for increasing the absolute value of dielectric anisotropy. Ring B is independently 1,4-cyclohexylene or 1,4-phenylene,and two rings B may be same or different from each other when g is 2 or 3. Desirable ring B is independently 1,4-cyclohexylene for decreasing the viscosity. Ring C and ring D are each independently 1,4-cyclohexylene, 1,4-phenylene, 2-fluoro-1,4-phenylene, 3-fluoro-1,4-phenylene or 2,5-difluoro-1,4-phenylene. Two rings C may be same or different from each other when j is 2 or 3. Desirable ring C and ring D are each independently 1,4-cyclohexylene for decreasing the viscosity. Ring E, ring E1, ring E2, ring F, ring F1 and ring F2 are each independently 1,4-cyclohexylene or 1,4-phenylene. Two rings E may be same or different from each other when k and p are 2 or 3. Two rings F may be same or different from each other when q is 2 or 3. Desirable ring E, ring E1, ring E2, ring F, ring F1 and ring F2 are each independently 1,4-cyclohexylene for decreasing the optical anisotropy.

Z1 and Z3 are each independently a single bond, ethylene, methyleneoxy or carbonyloxy. Two Z1 may be same or different from each other, when m and q are 2 or 3. Desirable Z1 and Z3 are each independently a single bond for decreasing a viscosity, or is methyleneoxy for increasing the absolute value of dielectric anisotropy. Z2 is independently a single bond, ethylene or carbonyloxy, two Z2 may be same or different from each other, when j and k are 2 or 3. Desirable Z2 is independently a single bond for decreasing a viscosity.

X1 and X2 are each independently fluorine or chlorine. Desirable X1 and X2 are each independently fluorine for decreasing the viscosity.

m and g are each independently 1, 2 or 3. Desirable m and g are each independently 1 for decreasing the minimum temperature, and is 2 for increasing the maximum temperature. k is 1, 2 or 3. Desirable k is 1 for decreasing the minimum temperature. p and q are each independently 0, 1, 2 or 3, and the sum thereof is 3 or less. Desirable p is 2 for increasing the maximum temperature. Desirable q is 0 for decreasing the minimum temperature.

Fifth, examples of the component compounds will be shown. In the desirable compounds described below, R5 is independently straight chained alkyl having 1 to 12 carbons or straight chained alkoxy having 1 to 12 carbons. R6 and R7 are each independently straight chained alkyl having 1 to 12 carbons or straight chained alkenyl having 2 to 12 carbons. In these compounds, trans is preferable to cis for the configuration of 1,4-cyclohexylene for increasing the maximum temperature.

Desirable compounds (1) are the compounds (1-1-1) to (1-6-1). More desirable compound (1) are the compounds (1-1-1), (1-3-1) and (1-5-1). Particularly desirable compounds (1) are the compounds (1-1-1) and (1-5-1). Desirable compounds (2) are the compound (2-1-1) and (2-2-1). Desirable compounds (3) are the compounds (3-1-1) to (3-10-1)). More desirable compound (3) are the compound (3-1-1), (3-3-1), (3-4-1), (3-6-1) and (3-10-1). Especially desirable compounds (3) are (3-1-1), (3-4-1) and (3-6-1). Desirable compounds (4-1) are the compounds (4-1-1-1) to (4-1-7-1). More desirable compounds (4-1) are the compounds (4-1-1-1), (4-1-2-1), (4-1-3-1), (4-1-4-1) and (4-1-5-1). Desirable compounds (4-2) are the compounds (4-2-1-1) to (4-2-1-2), (4-2-2-1), (4-2-3-1), (4-2-3-5), (4-2-4-1) and (4-2-4-2). More desirable compounds (4-2) are the compound (4-2-1-2), (4-2-3-1), (4-2-3-3) and (4-2-4-1). Especially desirable compounds (4-2) are the compounds (4-2-1-2) and (4-2-3-3).

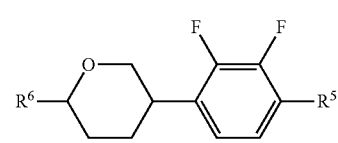
(1-1-1)

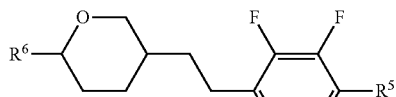
(1-2-1)

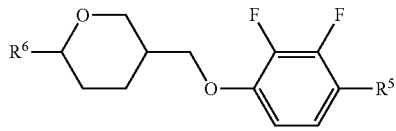
(1-3-1)

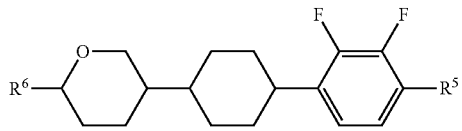
(1-4-1)

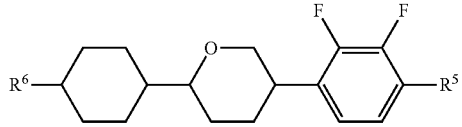
(1-5-1)

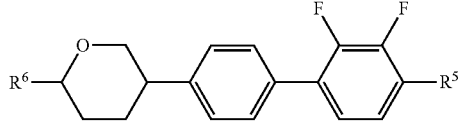
(1-6-1)

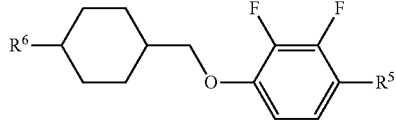
(2-1-1)

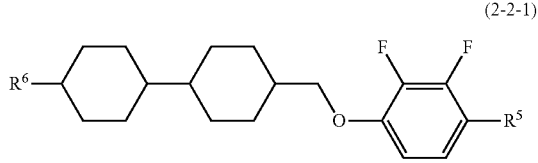
(2-2-1)

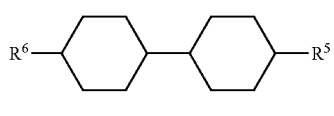
(3-1-1)

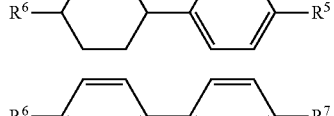
(3-2-1)

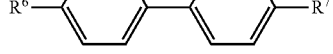
(3-3-1)

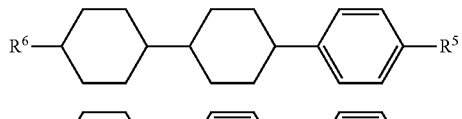
(3-4-1)

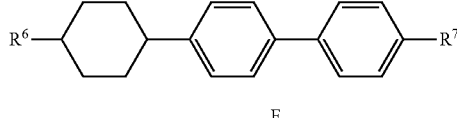
(3-5-1)

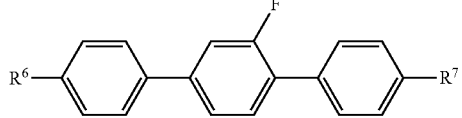
(3-6-1)

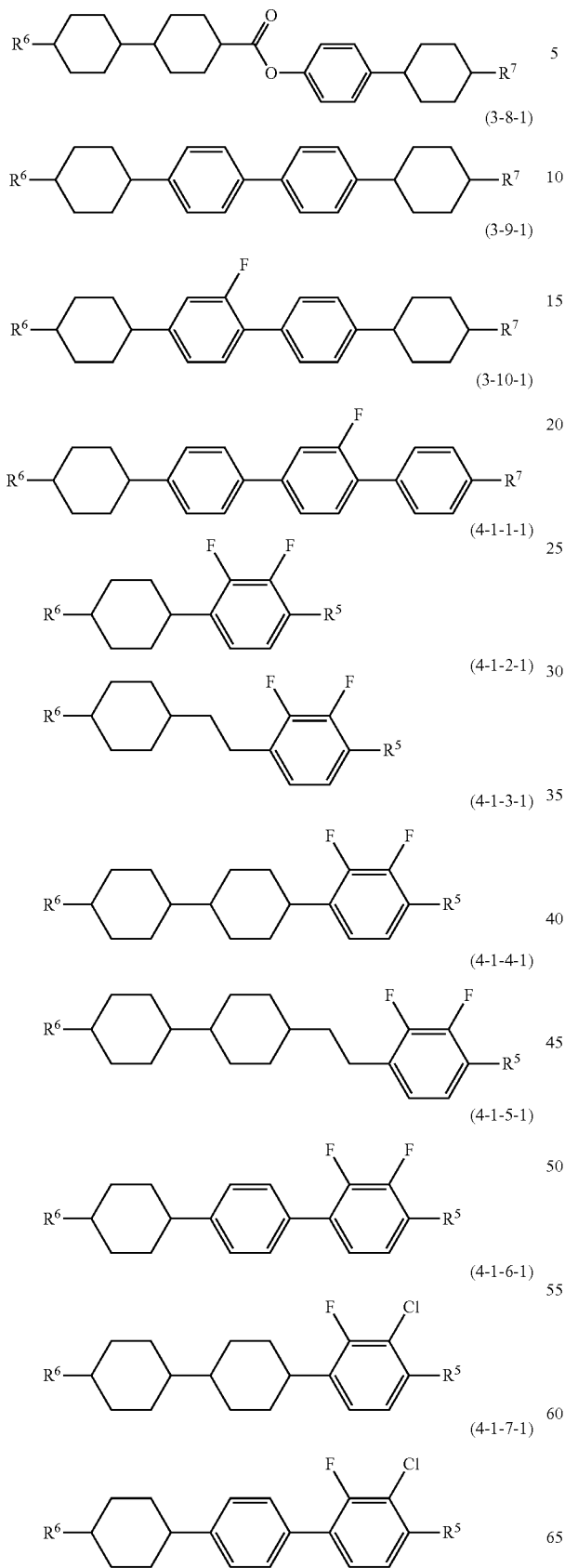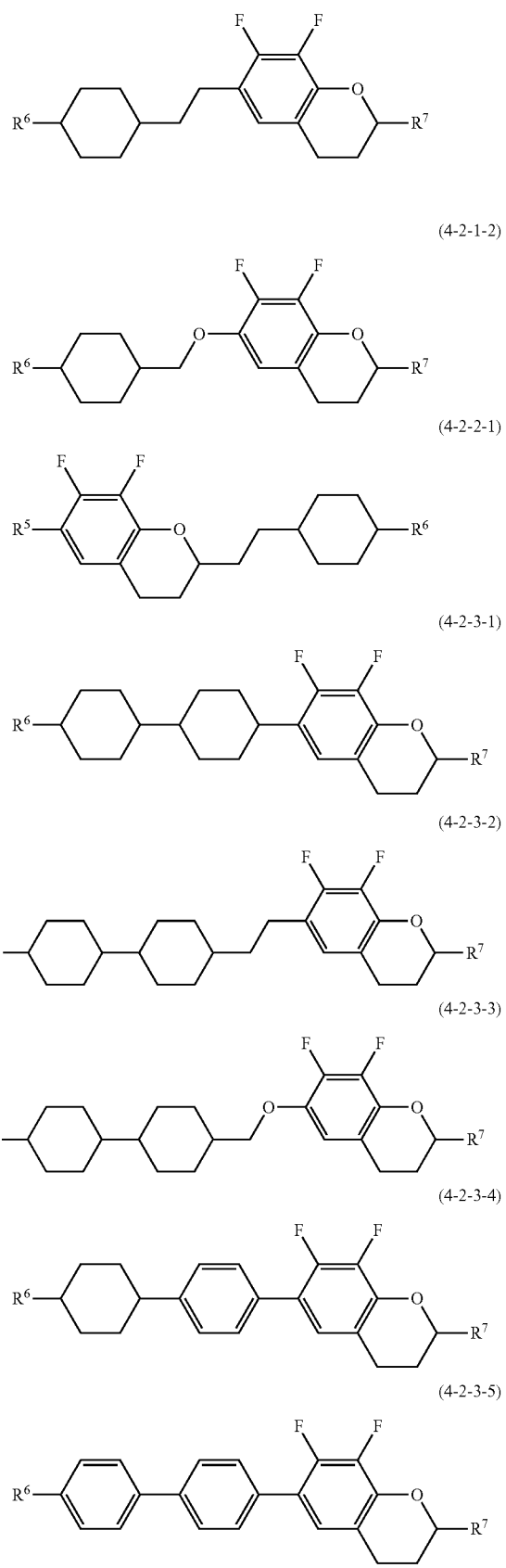

(4-2-4-1)

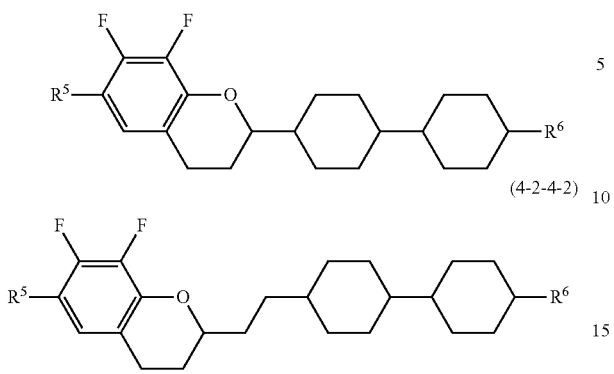

(4-2-4-2)

Sixth, additives capable of being mixed with the composition will be explained. The additives include an optically active compound, an antioxidant, an ultraviolet light absorbent, a coloring matter, an antifoaming agent, a polymerizable compound, a polymerization initiator and so forth. An optically active compound is mixed in the composition for inducing a helical structure of liquid crystal to provide a twist angle. Examples of the optically active compound include the compounds (5-1) to (5-4) below. A desirable ratio of the optically active compound is 5% by weight or less, and a more desirable ratio thereof ranges from 0.01% by weight to 2% by weight.

(5-1)

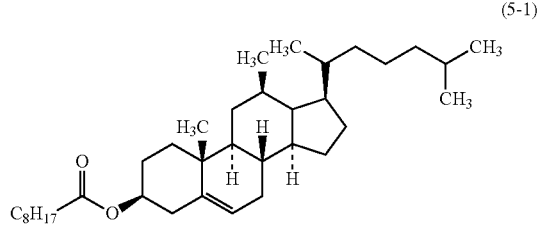

(5-2)

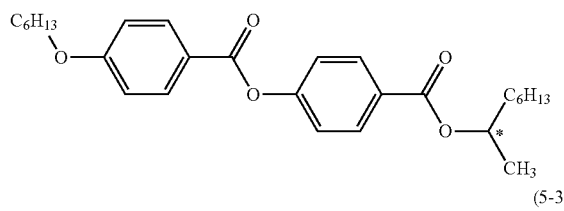

(5-3)

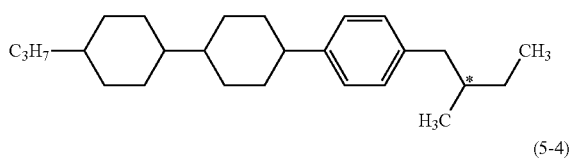

(5-4)

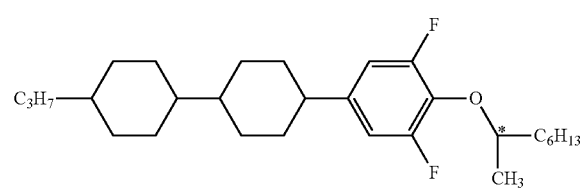

An antioxidant is mixed with the composition in order to avoid a decrease in specific resistance caused by heating in the air or to maintain a large voltage holding ratio at room temperature and also nearly at the maximum temperature even after the device was used for a long time.

(6)

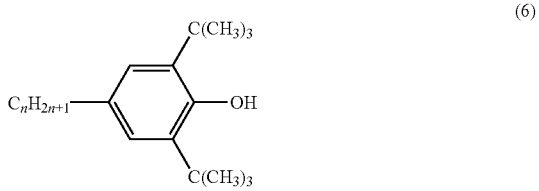

Preferred examples of the antioxidant include the compound (6) in which n is an integer from 1 to 9. In the compound (6), desirable n are 1, 3, 5, 7, or 9. More desirable n are 1 or 7. When n is 1, the compound (6) has a large volatility, and is effective in preventing the decrease of specific resistance caused by heating in the air. When n is 7, the compound (6) has a small volatility, and is effective in maintaining a large voltage holding ratio at room temperature and also at a high temperature even after the device was used for a long time. A desirable ratio of the antioxidant is 50 ppm or more in order to obtain the advantages thereof and is 600 ppm or less in order to prevent the decrease of maximum temperature and to prevent the increase of minimum temperature. A more desirable ratio is from 100 ppm to 300 ppm.

Preferred examples of the ultraviolet light absorbent include a benzophenone derivative, a benzoate derivative and a triazole derivative. A light stabilizer having steric hindrance such as an amine is also desirable. A desirable ratio of the absorbent and the stabilizer is 50 ppm or more for obtaining the advantages thereof and is 10,000 ppm or less for preventing the decreasing of maximum temperature and preventing the increase of minimum temperature. A more desirable ratio thereof ranges from 100 ppm to 10,000 ppm.

A dichroic dye such as an azo dye or an anthraquinone dye is mixed with the composition to suit for a device of a guest host (GH) mode. A desirable ratio of the dye ranges from 0.01% by weight to 10% by weight. An antifoaming agent such as dimethyl silicone oil or methylphenyl silicone oil is mixed with the composition for preventing foaming from occurring. A desirable ratio of the antifoaming agent is 1 ppm or more for obtaining the advantages thereof and is 1,000 ppm or less for preventing display failure from occurring. A more desirable ratio thereof ranges from 1 ppm to 500 ppm.

A polymerizable compound is mixed with the composition for applying the composition to a device having a PSA (polymer sustained alignment) mode. Preferred examples of the polymerizable compound include compounds having a polymerizable group, such as acrylate, methacrylate, vinyl, vinyloxy, propenyl ether, vinylketone, epoxy such as oxirane, oxetane, and so forth. Particularly preferred examples thereof include derivatives of acrylate or methacrylate. A desirable ratio of the polymerizable group is from 0.05% by weight or more for obtaining the advantages thereof, and is 10% by weight or less for preventing display failure from occurring. A more desirable ratio is from 0.1% by weight to 2% by weight.

The polymerizable compound is polymerized preferably in the presence of a suitable initiator, such as a photopolymerization initiator and so forth, under radiation of ultraviolet light. Suitable conditions for polymerization and a suitable type and a suitable amount of the initiator have been known by a skilled person in the art and are disclosed in literatures. Examples of the photopolymerization initiator suitable for radical polymerization include Irgacure 651 (trade name), Irgacure 184 (trade name) and Darocure 1173 (trade name), all produced by Ciba Japan K.K.. The polymerizable compound preferably contains a photopolymerization initiator in an amount of from 0.1% by weight to 5% by weight, and particularly preferably contains a photopolymerization initiator in an amount of from 1% by weight to 3% by weight.

Seventh, the preparation methods of the component compounds will be explained. These compounds can be prepared by known methods. The preparation method will be exemplified below. The compound (1-2-2) is synthesized by the method disclosed in JP 2000-008040 A. The compounds (2-1-1) and (2-2-1) are synthesized by the method disclosed in JP H2-503568 A. The compounds (3-1-1) and (3-4-1) are synthesized by the method disclosed in JP S59-176221 A. The compounds (4-1-1-1) and (4-1-3-1) are synthesized by the method disclosed in JP H2-503441 A. The compound (4-2-2-1) is synthesized by the method disclosed in JP 2005-35986 A. The antioxidant is commercially available. The compound (6), wherein n is 1, is available, for example, from Sigma-Aldrich, Inc. The compound (6), wherein n is 7, and so forth are prepared by the method disclosed in U.S. Pat. No. 3,660,505.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. The compositions of the invention mainly have a minimum temperature of −10° C. or less, a maximum temperature of 70° C. or more, and an optical anisotropy of 0.07 to 0.20. The device containing the composition has a large voltage holding ratio. The composition is suitable for an AM device. The composition is suitable especially for an AM device of a transmission type. The composition having an optical anisotropy of 0.08 to 0.25 and further having an optical anisotropy of 0.10 to 0.30 may be prepared by controlling ratios of the component compounds or by mixing other liquid crystal compounds. The composition can be used as a composition having a nematic phase and as an optically active composition by adding an optically active compound.

The composition can be used for an AM device. It can be also used for a PM device. The composition can be also used for an AM device and a PM device having a mode such as PC, TN, STN, ECB, OCB, IPS, VA, PSA and so forth. It is desirable to use the composition for an AM device having a TN, OCB or IPS mode. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition.

EXAMPLES

A sample of the liquid crystal compound for measuring characteristics includes two cases, i.e., the case where the compound itself is used as a sample, and the case where the compound is mixed with mother liquid crystals to prepare a sample.

In the later case where a sample is prepared by mixing the compound with mother liquid crystals, the measurement is carried out in the following manner. A sample was produced by mixing 15% by weight of the compound and 85% by weight of mother liquid crystals. A value of characteristics of the compound was calculated by extrapolating from a value obtained by measurement.

Extrapolated Value=(100×(measured value of sample)−(percentage by weight of mother liquid crystals)×(value measured for mother liquid crystals))/(percentage by weight of liquid crystal compound)

In the case where a smectic phase was exhibited at 25° C. or crystals were deposited at 25° C. at this ratio of the liquid crystal compound and the mother liquid crystals, the ratio of the compound and the mother liquid c by weight), respectively. The value of characteristics of the sample was measured at a ratio where a smectic phase or crystals were not deposited at 25° C., and an extrapolated value was obtained by the aforementioned equation, which was designated as a value of characteristics of the liquid crystal compound.

While there are various kinds of mother liquid crystals for the aforementioned measurement, the composition of the mother liquid crystals was as follows, for example.

Mother Liquid Crystals is:

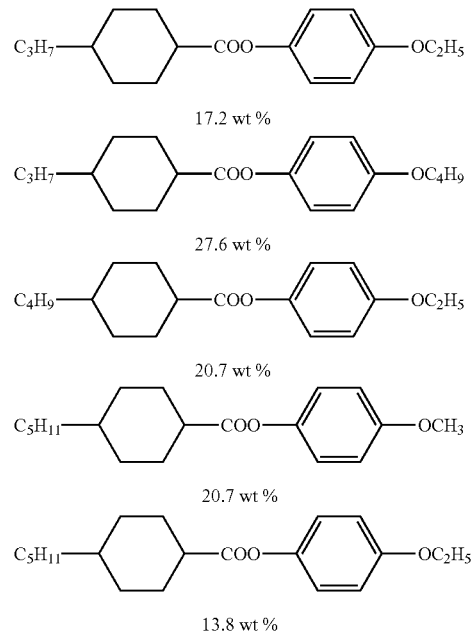

Measurement of the characteristics was carried out according to the following methods. Most methods are described in the Standard of Electric Industries Association of Japan, EIAJ ED-2521 A or those with some modifications.

Maximum Temperature of Nematic Phase (NI; ° C.):

A sample was placed on a hot plate in a melting point apparatus equipped with a polarizing microscope, and while heating at the rate of 1° C. per minute, was observed with the polarizing microscope. A temperature where a part of the sample is changed from a nematic phase to an isotropic liquid was measured. The maximum temperature of a nematic phase may be abbreviated to "a maximum temperature" in some cases.

Minimum Temperature of Nematic Phase (Tc; ° C.):

The glass bottles containing a sample having a nematic phase were stored in a freezer at 0° C., −10° C., −20° C., −30° C., −40° C. for a prescribed period of time. For example, a sample at −20° C. remains a nematic phase. When a sample changes to crystal of smectic phase at 30° C. Tc is expressed as $\leq$−20° C. The minimum temperature of a nematic phase may be abbreviated to "a minimum temperature".

Viscosity (bulk viscosity; η; measured at 20° C.; mPa·s):

The viscosity was measured by means of an E-type viscometer.

Viscosity (rotational viscosity; γ1; measured at 25° C.; mPa·s):

Measurement was carried out according to the method described in M. Imai, et al., Molecular Crystals and Liquid Crystals, Vol. 259, 37 (1995). A sample was poured into a TN device having a twist angle of 0 degrees and the distance between two glass substrates (cell gap) of 5 μm. The TN device was impressed with a voltage stepwise with an increment of 0.5 volt in the range of 16 to 19.5 volts. After a period of 0.2 second without impressed no impress of voltage, voltage impress was repeated under the conditions of with only one rectangular wave (rectangular pulse; of 0.2 second) and no impress of voltage impressed (2 seconds). The peak current and the peak time of the transient current generated by the voltage impressed were measured. The value of rotational viscosity was obtained from the measured values and the calculating equation (8) in page 40 of the paper presented by M. Imai, et al. The value of dielectric anisotropy necessary for this calculation was obtained by use of the device that had been used for the present measurement of rotational viscosity, according to the method that will be described below.

Optical Anisotropy (refractive index anisotropy; Δn; measured at 25° C.):

Measurement was carried out with an Abbe refractometer mounting a polarizing plate on an ocular using a light at a wavelength of 589 nm. The surface of a main prism was rubbed in one direction, and then a sample was dropped on the main prism. Refractive index (n∥) was measured when the direction of a polarized light was parallel to that of the rubbing. Refractive index (n⊥) was measured when the direction of a polarized light was perpendicular to that of the rubbing. A value of optical anisotropy was calculated from the equation: Δn=n∥−n⊥.

Dielectric Anisotropy (Δε; measured at 25° C.):

A sample was put in a TN device having a distance between two glass substrates (cell gap) of 9 μm and a twist angle of 80.° Sine waves (10 V, 1 kHz) were applied to the device, and a dielectric constant (ε∥) in a major axis direction of a liquid crystal molecule was measured after 2 seconds. Sine waves (0.5 V, 1 kHz) were applied to the device, and a dielectric constant (ε⊥) in a minor axis direction of a liquid crystal molecule was measured after 2 seconds. A value of a dielectric anisotropy was calculated from the equation: Δε=ε∥−ε⊥.

Threshold Voltage (Vth; measured at 25° C.; V):

Measurement was carried out with an LCD Evaluation System Model LCD-5100 made by Otsuka Electronics Co., Ltd. The light source was a halogen lamp. A sample was poured into a VA device of a normally black mode, and the device was sealed with UV curable adhesive. Voltage to be applied to the device (60 Hz, rectangular waves) was stepwise increased by 0.02V starting from 0V up to 20V. During the stepwise increasing, the device was irradiated with light in a perpendicular direction, and an amount of the light passing through the device was measured. Voltage-transmission curve was prepared, in which a maximum amount of a light corresponded to 100% transmittance, and a minimum amount of a light corresponded to 0% transmittance. Threshold voltage is a value at 10% transmittance.

Voltage Holding Ratio (VHR-1; measured at 25° C.; %):

A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was applied and charged with pulse voltage (60 microseconds at 5V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-2; measured at 80° C.; %):

A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was applied and charged with pulse voltage (60 microseconds at 5V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-3; measured at 25° C.; %):

A voltage holding ratio was measured after irradiating with ultraviolet light to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 16.7 milliseconds. VHR-3 is desirably 90% or more, and more desirably 95% or more.

Voltage Holding Ratio (VHR-4; measured at 25° C.; %):

A voltage holding ratio was measured after heating a TN device having a sample poured therein in a constant-temperature bath at 80° C. for 500 hours to evaluate stability to heat. A composition having large VHR-4 has a large stability to heat. In measurement of VHR-4, a decreasing voltage is measured for 16.7 milliseconds.

Response Time (τ; measured at 25° C.; millisecond):

Measurement was carried out with an LCD Evaluation System Model LCD-5100 made by Otsuka Electronics Co., Ltd. Light source is a halogen lamp. Low-pass filter was set at 5 kHz. A sample was poured into a VA device of a normally black mode, in which a rubbing direction is anti-parallel. The device was sealed with UV curable adhesive, rectangle waves (60 Hz, 10V, 0.5 seconds) were applied thereto. During application, the device was irradiated with light in a perpendicular direction, and an amount of the light passing through the device was measured. A maximum amount of a light corresponds to 100% transmittance, and a minimum amount of a light corresponds to 0% transmission. Fall time (τr; millisecond) is a period of time required for the change in transmittance from 90% to 10%.

Specific Resistance (ρ; measured at 25° C.; Ωcm):

1.0 ml of a sample was charged in a vessel equipped with electrodes. A direct current voltage of 10V was applied to the vessel, and after lapsing 10 second from the application of voltage, the direct electric current was measured. The specific resistance was calculated by the equation:

(specific resistance)=((voltage)×(electric capacity of vessel))/(((direct current)×(dielectric constant of vacuum)).

Gas Chromatographic Analysis:

A Gas Chromatograph Model GC-14B made by Shimadzu Corporation was used for measurement. The carrier gas was helium (2 milliliters per minute). The evaporator and the detector (FID) were set up at 280° C. and 300° C., respectively. A capillary column DB-1 (length 30 meters, bore 0.32 millimeter, film thickness 0.25 μm, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight) and 1 microliter of the solution was injected into the evaporator. A recorder used was a Model C-R5A Chromatopac Integrator made by Shimadzu Corporation or its equivalent. A gas chromatogram obtained showed the retention time of peaks and the peak areas corresponding to the component compounds.

Solvents for diluting the sample may also be chloroform, hexane, and so forth. The following capillary columns may also be used in order to separate the component compounds: HP-1 made by Agilent Technologies Inc. (length 30 meters, bore 0.32 millimeter, film thickness 0.25 μm), Rtx-1 made by Restek Corporation (length 30 meters, bore 0.32 millimeter, film thickness 0.25 μm), and BP-1 made by SGE International Pty. Ltd. (length 30 meters, bore 0.32 millimeter, film thickness 0.25 μm). A capillary column CBP1-M50-025 (length 50 meters, bore 0.25 millimeter, film thickness 0.25 μm) made by Shimadzu Corporation may also be used for the purpose of avoiding an overlap of peaks of the compounds.

The ratio of the liquid crystal compound included in the composition may be calculated according to the following method. The liquid crystal compounds are detected by use of a gas chromatograph. The ratio of peak areas in the gas chromatogram corresponds to the ratio (in moles) of the liquid crystal compounds. When the capillary columns described above are used, the correction coefficient of respective liquid crystal compounds may be regarded as 1 (one). Accordingly, the ratio (% by weight) of the liquid crystal compound can be calculated from the ratio of peak areas.

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene is trans. The parenthesized number next to the symbolized compounds in the Examples corresponds to the number of the desirable compound. The symbol (-) means other liquid crystal compound. A ratio (percentage) of a liquid crystal compound is percentage by weight (% by weight) based on the total weight of liquid crystal compounds, and the liquid crystal compositions further contain impurities. Last, the characteristics of the composition are summarized.

TABLE 3

Method of Description of Compoteid using Symbols
R—($A_1$)—$Z_1$—...—$Z_n$—($A_n$)—R'

| 1) Left Terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right Terminal Group —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —$COOCH_3$ | —Eme |

| 3) Bonding Group —Zn— | Symbol |
|---|---|
| —$C_2H_4$— | 2 |
| —COO— | E |
| —CH=CH— | V |
| —C≡C— | T |
| —$CF_2O$— | X |
| —$CH_2O$— | 1O |
| —$SiH_2$— | Si |

| 4) Ring Structure —An— | Symbol |
|---|---|
| 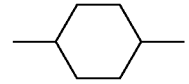 | H |
| 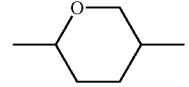 | Dh |
| 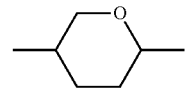 | dh |
| 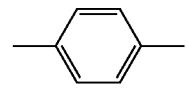 | B |
| 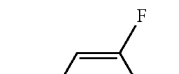 | B(F) |
| 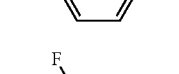 | B(2F) |
| 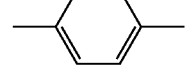 | B(2F,3F) |
| 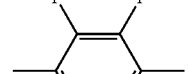 | B(2F,3Cl) |

TABLE 3-continued

Method of Description of Compoteid using Symbols
R—(A₁)—Z₁— ... —Zₙ—(Aₙ)—R'

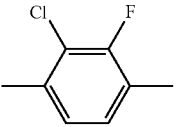  B(2Cl,3F)

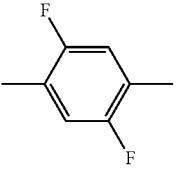  B(2F,5F)

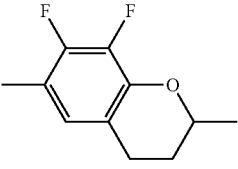  Cro(7F,8F)

5) Example of Description

Example 1 V2—BB(F)B-1

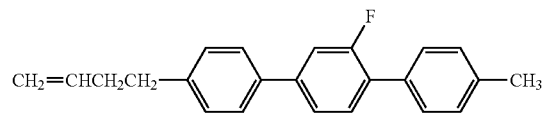

Example 2 3-DhB(2F,3F)—O2

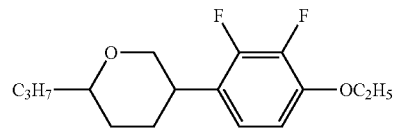

Example 3 3-HHB-1

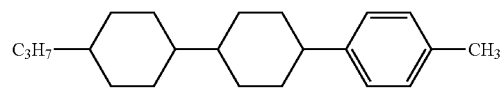

Example 4 5-HBB(F)B-3

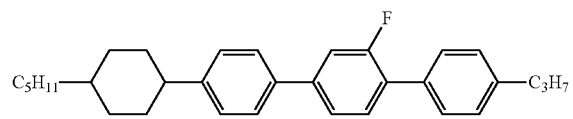

Comparative Example 1

Example 19 was selected from the compositions disclosed in JP 2001-262145 A. The basis is that the composition contains compounds (1-5-1), (3-1-1), (3-2-1) and (3-4-1) and the viscosity is the smallest. The component and characteristics of the composition are as follows.1

| | | |
|---|---|---|
| 3-HDhB(2F,3F)-O2 | (1-5-1) | 6% |
| 5-HDhB(2F,3F)-O2 | (1-5-1) | 6% |
| 2-HH1SiB(2F,3F)-O2 | (—) | 6% |
| 3-HH1SiB(2F,3F)-O2 | (—) | 6% |
| 2-HH-3 | (3-1-1) | 6% |
| 3-HH-4 | (3-1-1) | 10% |
| 3-HB-O2 | (3-2-1) | 16% |
| 3-HB-O4 | (3-2-1) | 4% |
| 3-HHB-1 | (3-4-1) | 8% |
| 3-HHB-O1 | (3-4-1) | 5% |
| 3-HHB-3 | (3-4-1) | 8% |
| 2-HH-EMe | (—) | 4% |
| 3-HH-EMe | (—) | 15% |

NI = 80.4° C.; Tc ≤ −20° C.; Δn = 0.077; η = 14.3 mPa·s; Δε = −1.4.

Comparative Example 2

Example 12 was selected from the compositions disclosed in JP 2001-115161 A. The basis is that the composition contains compounds (1-1-1), (1-2-1), (1-5-1), (3-1-1), (3-2-1) and (3-4-1), and η is the smallest. The component and characteristics of the composition are as follows.

| | | |
|---|---|---|
| 3-DhB(2F,3F)-O2 | (1-1-1) | 3% |
| 5-DhB(2F,3F)-O2 | (1-1-1) | 6% |
| 3-Dh2B(2F,3F)-O2 | (1-2-1) | 3% |
| 3-HDhB(2F,3F)-O1 | (1-5-1) | 7% |
| 3-HDhB(2F,3F)-O2 | (1-5-1) | 7% |
| 3-HH-4 | (3-1-1) | 12% |
| 3-HB-O2 | (3-2-1) | 16% |
| 3-HB-O4 | (3-2-1) | 8% |
| 3-HHB-1 | (3-4-1) | 7% |
| 3-HHB-O1 | (3-4-1) | 5% |
| 3-HHB-3 | (3-4-1) | 10% |
| 2-HH-EMe | (—) | 6% |
| 3-HH-EMe | (—) | 10% |

NI = 72.0° C.; Tc ≤ −20° C.; Δn = 0.076; η = 16.2 mPa·s; Δε = −1.2.

Example 1

| | | |
|---|---|---|
| 3-DhHB(2F,3F)-O2 | (1-4-1) | 5% |
| 3-HDhB(2F,3F)-O2 | (1-5-1) | 10% |
| 5-HDhB(2F,3F)-O2 | (1-5-1) | 7% |
| 3-DhBB(2F,3F)-O2 | (1-6-1) | 5% |
| 5-DhBB(2F,3F)-O2 | (1-6-1) | 5% |
| 3-HH1OB(2F,3F)-O2 | (2-2-1) | 7% |
| 4-HH1OB(2F,3F)-O2 | (2-2-1) | 6% |
| 5-HH1OB(2F,3F)-O2 | (2-2-1) | 7% |
| V-HH-3 | (3-1-1) | 43% |
| V-HHB-1 | (3-4-1) | 5% |

NI = 99.0° C.; Tc ≤ −20° C.; Δn = 0.084; η = 12.1 mPa·s; Δε = −3.4; Vth = 2.22 V; γ1 = 41.6 mPa·s; VHR-1 = 99.2%; VHR-2 = 98.2%; VHR-3 = 98.2%.

Example 2

| | | |
|---|---|---|
| 3-DhB(2F,3F)-O2 | (1-1-1) | 5% |
| 5-DhB(2F,3F)-O2 | (1-1-1) | 8% |
| 3-H1OB(2F,3F)-O2 | (2-1-1) | 10% |
| 5-H1OB(2F,3F)-O2 | (2-1-1) | 8% |
| 3-HH1OB(2F,3F)-O2 | (2-2-1) | 7% |
| 5-HH1OB(2F,3F)-O2 | (2-2-1) | 5% |
| 2-HH-3 | (3-1-1) | 5% |
| V-HH-3 | (3-1-1) | 30% |
| V-HHB-1 | (3-4-1) | 7% |
| 5-HBB(F)B-2 | (3-10-1) | 3% |

-continued

| | | |
|---|---|---|
| 5-HBB(F)B-3 | (3-10-1) | 3% |
| 3-HH2Cro(7F,8F)-5 | (4-2-3-2) | 3% |
| 3-HBCro(7F,8F)-5 | (4-2-3-4) | 3% |
| 3-BBCro(7F,8F)-5 | (4-2-3-5) | 3% |

NI = 71.3° C.; Tc ≦ −20° C.; Δn = 0.085; η = 13.3 mPa · s; Δε = −3.4; Vth = 2.20 V; γ1 = 42.7 mPa · s; VHR-1 = 99.1%; VHR-2 = 98.1%; VHR-3 = 98.1%.

Example 3

| | | |
|---|---|---|
| 3-Dh2B(2F,3F)-O2 | (1-2-1) | 9% |
| 3-Dh1OB(2F,3F)-O2 | (1-3-1) | 6% |
| 3-HH1OB(2F,3F)-O2 | (2-2-1) | 6% |
| 5-HH1OB(2F,3F)-O2 | (2-2-1) | 6% |
| V-HH-3 | (3-1-1) | 32% |
| 1V-HH-3 | (3-1-1) | 7% |
| 3-HB-O2 | (3-2-1) | 3% |
| 1V-HBB-2 | (3-5-1) | 4% |
| 2-BB(F)B-3 | (3-6-1) | 5% |
| 3-HBB(2F,3F)-O2 | (4-1-5-1) | 6% |
| 5-HBB(2F,3F)-O2 | (4-1-5-1) | 6% |
| 3-H2Cro(7F,8F)-5 | (4-2-1-1) | 3% |
| 3-H1OCro(7F,8F)-5 | (4-2-1-2) | 4% |
| 3-HHCro(7F,8F)-5 | (4-2-3-1) | 3% |

NI = 72.4° C.; Tc ≦ −20° C.; Δn = 0.090; η = 11.1 mPa · s; Δε = −2.8; VHR-1 = 99.0%; VHR-2 = 98.1%; VHR-3 = 98.0%.

Example 4

| | | |
|---|---|---|
| 3-DhHB(2F,3F)-O2 | (1-4-1) | 10% |
| 5-DhHB(2F,3F)-O2 | (1-4-1) | 5% |
| 3-DhBB(2F,3F)-O2 | (1-6-1) | 5% |
| 3-H1OB(2F,3F)-O2 | (2-1-1) | 5% |
| 5-H1OB(2F,3F)-O2 | (2-1-1) | 5% |
| V-HH-3 | (3-1-1) | 40% |
| 1-BB(F)B-2V | (3-6-1) | 5% |
| 3-HHEBH-5 | (3-7-1) | 3% |
| V-HB(2F,3F)-O2 | (4-1-1-1) | 5% |
| 3-H2B(2F,3F)-O2 | (4-1-2-1) | 5% |
| 3-H2Cro(7F,8F)-3 | (4-2-1-1) | 3% |
| 3-H2Cro(7F,8F)-5 | (4-2-1-1) | 3% |
| 2O-Cro(7F,8F)HH-5 | (4-2-4-1) | 3% |
| 3-Cro(7F,8F)2HH-5 | (4-2-4-2) | 3% |

NI = 70.4° C.; Tc ≦ −20° C.; Δn = 0.082; η = 13.0 mPa · s; Δε = −2.6; VHR-1 = 99.1%; VHR-2 = 98.0%; VHR-3 = 98.0%.

Example 5

| | | |
|---|---|---|
| 3-HDhB(2F,3F)-O2 | (1-5-1) | 10% |
| 5-HDhB(2F,3F)-O2 | (1-5-1) | 4% |
| 3-H1OB(2F,3F)-O2 | (2-1-1) | 4% |
| 5-H1OB(2F,3F)-O2 | (2-1-1) | 4% |
| V-HH-3 | (3-1-1) | 32% |
| 1V-HH-3 | (3-1-1) | 8% |
| V2-BB-1 | (3-3-1) | 6% |
| V2-HHB-1 | (3-4-1) | 5% |
| 2-HBB(2F,3F)-O2 | (4-1-5-1) | 5% |
| 3-HBB(2F,3F)-O2 | (4-1-5-1) | 11% |
| 2-Cro(7F,8F)2H-3 | (4-2-2-1) | 3% |
| 2O-Cro(7F,8F)2H-3 | (4-2-2-1) | 3% |
| 3-HH1OCro(7F,8F)-5 | (4-2-3-3) | 5% |

NI = 77.2° C.; Tc ≦ −20° C.; Δn = 0.088; η = 11.3 mPa · s; Δε = −2.7; VHR-1 = 99.2%; VHR-2 = 98.2%; VHR-3 = 98.0%.

Example 6

| | | |
|---|---|---|
| 3-HDhB(2F,3F)-O2 | (1-5-1) | 10% |
| 3-HH1OB(2F,3F)-O2 | (2-2-1) | 4% |
| 5-HH1OB(2F,3F)-O2 | (2-2-1) | 4% |
| 3-HH-O1 | (3-1-1) | 3% |
| V-HH-3 | (3-1-1) | 32% |
| V-HH-5 | (3-1-1) | 10% |
| 5-HBBH-3 | (3-8-1) | 3% |
| 5-HB(F)BH-3 | (3-9-1) | 3% |
| 3-HB(2F,3F)-O2 | (4-1-1-1) | 6% |
| V-HHB(2F,3F)-O2 | (4-1-3-1) | 6% |
| 3-HBB(2F,3F)-O2 | (4-1-5-1) | 10% |
| 3-HHB(2F,3Cl)-O2 | (4-1-6-1) | 4% |
| 3-H2Cro(7F,8F)-5 | (4-2-1-1) | 5% |

NI = 92.2° C.; Tc ≦ −20° C.; Δn = 0.084; η = 11.7 mPa · s; Δε = −2.8; VHR-1 = 99.1%; VHR-2 = 98.2%; VHR-3 = 98.2%.

Example 7

| | | |
|---|---|---|
| 3-HDhB(2F,3F)-O2 | (1-5-1) | 5% |
| 3-HH1OB(2F,3F)-O2 | (2-2-1) | 6% |
| 5-HH1OB(2F,3F)-O2 | (2-2-1) | 6% |
| 3-HHEH-5 | (3) | 3% |
| 3-HH-VFF | (3-1) | 3% |
| V-HH-3 | (3-1-1) | 30% |
| 1V2-BB-1 | (3-3-1) | 4% |
| V2-BB(F)B-1 | (3-6-1) | 5% |
| 3-HHEBH-5 | (3-7-1) | 3% |
| 3-HB(2F,3F)-O2 | (4-1-1-1) | 7% |
| 5-HB(2F,3F)-O2 | (4-1-1-1) | 7% |
| 3-HHB(2F,3F)-O2 | (4-1-3-1) | 6% |
| 3-HH2B(2F,3F)-O2 | (4-1-4-1) | 4% |
| 5-HBB(2F,3Cl)-O2 | (4-1-7-1) | 5% |
| 3-HH1OCro(7F,8F)-5 | (4-2-3-3) | 6% |

NI = 72.2° C.; Tc ≦ −20° C.; Δn = 0.086; η = 12.7 mPa · s; Δε = −2.3; VHR-1 = 99.0%; VHR-2 = 98.1%; VHR-3 = 98.1%.

Example 8

| | | |
|---|---|---|
| 3-HDhB(2F,3F)-O2 | (1-5-1) | 10% |
| 3-DhHB(2F,3F)-O2 | (1-4-1) | 6% |
| 3-H1OB(2F,3F)-O2 | (2-1-1) | 5% |
| 5-H1OB(2F,3F)-O2 | (2-1-1) | 5% |
| 3-HH1OB(2F,3F)-O2 | (2-2-1) | 5% |
| 5-HH1OB(2F,3F)-O2 | (2-2-1) | 5% |
| 3-BB(2F,5F)B-2 | (3) | 3% |
| V-HH-3 | (3-1-1) | 37% |
| 1V-HH-3 | (3-1-1) | 6% |
| 3-HHB-1 | (3-4-1) | 4% |
| 3-HHB-O1 | (3-4-1) | 4% |
| 5-HBB(2F,3Cl)-O2 | (4-1-7-1) | 6% |
| 1O1-HBBH-5 | (—) | 4% |

NI = 92.1° C.; Tc ≦ −20° C.; Δn = 0.083; η = 11.3 mPa · s; Δε = −2.4; VHR-1 = 99.1%; VHR-2 = 98.1%; VHR-3 = 98.0%.

The compositions of Examples 1 to 8 have a negatively larger dielectric anisotropy and smaller viscosity than those of Comparative example 1 and 2. The liquid crystal composition of the invention has better characteristics than those of the liquid crystal composition disclosed in patent documents 1 and 2.

The liquid crystal composition that satisfies at least one of characteristics such as a high maximum temperature of a nematic phase, a low minimum temperature of a nematic phase, a small viscosity, a suitable optical anisotropy, a negatively large dielectric anisotropy, a large specific resistance, a high stability to ultraviolet light, and a high stability to heat, or that is suitably balanced regarding at least two characteristics thereof. The liquid crystal display devices containing the composition are desirable for an AM device having a short response time, a large voltage holding ratio, a large contrast ratio, a long service life and so forth, and can be used for a liquid crystal projector, a liquid crystal television and so forth.

What is claimed is:

1. The invention concerns a liquid crystal composition having a negative dielectric anisotropy that includes two components, wherein the first component is at least one compound selected from the group of compounds represented by formula (1), the second component is at least one compound selected from the group of compounds represented by formula (2):

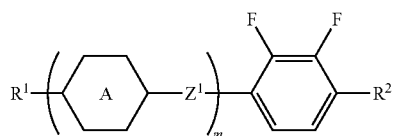
(1)

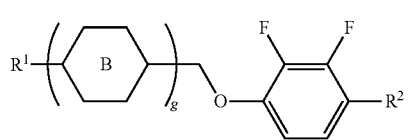
(2)

wherein $R^1$ and $R^2$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine; ring A is independently 1-pyran-2,5-diyl, 1,4-cyclohexylene or 1,4-phenylene, at least one ring A is 1-pyran-2,5-dyil; ring B is independently 1,4-cyclohexylene or 1,4-phenylene; $Z^1$ is independently a single bond, ethylene, methyleneoxy or carbonyloxy; and m and g are each independently 1, 2 or 3.

2. The liquid crystal composition according to item 1, wherein the first component is at least one compound selected from the group of compounds represented by formula (1-1) to (1-6):

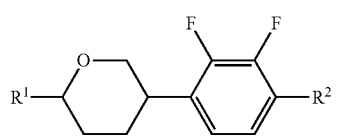
(1-1)

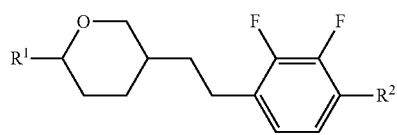
(1-2)

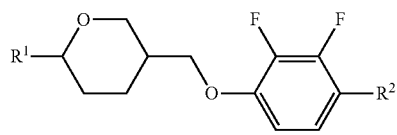
(1-3)

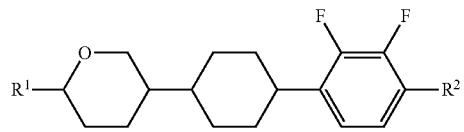
(1-4)

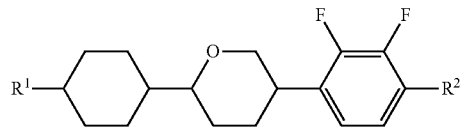
(1-5)

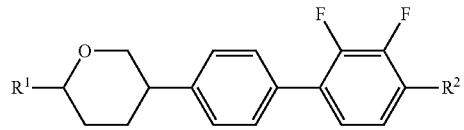
(1-6)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

3. The liquid crystal composition according to claim 2, wherein the first component is at least one compound selected from the group of compounds represented by formula (1-1) to (1-3).

4. The liquid crystal composition according to claim 2, wherein the first component is at least one compound selected from the group of compounds represented by formula (1-4) to (1-6).

5. The liquid crystal composition according to claim 2, wherein the first component is a mixture of at least one compound selected from the group of compounds represented by formula (1-1) to (1-3), and at least one compound selected from the group of compounds represented by formula (1-4) to (1-6).

6. The liquid crystal composition according to claim 1, wherein the second component is at least one compound selected from the group of compounds represented by formula (2-1) to (2-2):

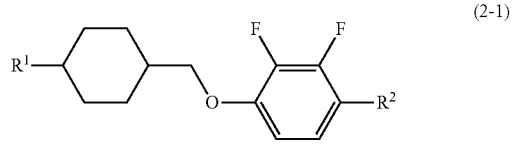
(2-1)

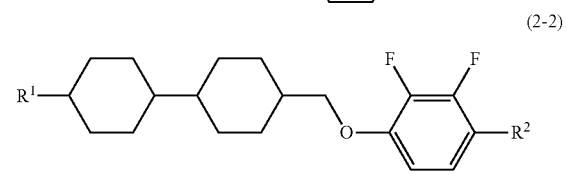
(2-2)

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

7. The liquid crystal composition according to claim 6, wherein the second component is at least one compound selected from the group of compounds represented by formula (2-2).

8. The liquid crystal composition according to claim 1, wherein the ratio of the first component is from 5% by weight to 50% by weight, and the ratio of the second component is from 5% by weight to 50% by weight, based on the total weight of liquid crystal composition.

9. The liquid crystal composition according to claim 1, which further contains at least one compound selected from the group of compounds represented by formula (3) as a third component

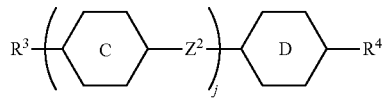
(3)

wherein $R^3$ and $R^4$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring C and ring D are each independently 1,4-cyclohexylene, 1,4-phenylene, 2-fluoro-1,4-phenylene,3-fluoro-1,4-phenylene or 2,5-difluoro-1,4-phenylene; $Z^2$ is independently a single bond, ethylene, or carbonyloxy; j is 1, 2 or 3.

10. The liquid crystal composition according to claim 9, wherein the third component is at least one compound selected from the group of compounds represented by formula (3-1) to (3-10):

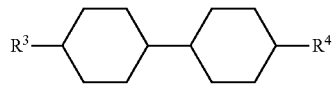
(3-1)

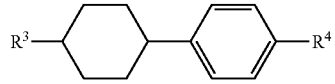
(3-2)

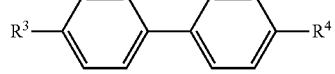
(3-3)

(3-4)

(3-5)

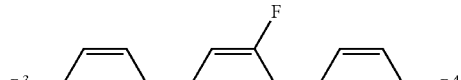
(3-6)

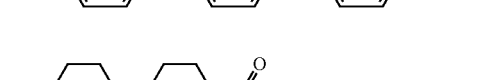
(3-7)

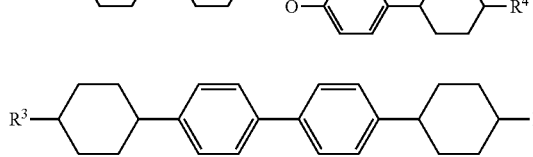
(3-8)

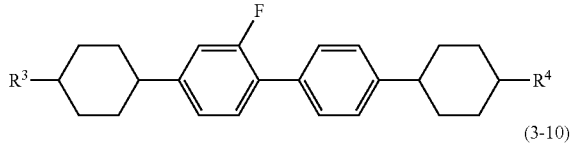
(3-9)

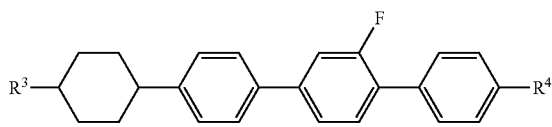
(3-10)

wherein $R^3$ and $R^4$ are each independently alkyl having 1 to 12 carbons, alkoxy having 1 to 12 carbons, alkenyl having 2 to 12 carbons or alkenyl having 2 to 12 carbons in which arbitrary hydrogen is replaced by fluorine.

11. The liquid crystal composition according to claim 9, wherein a ratio of the third component is from 30% by weight to 70% by weight based on the total weight of the liquid crystal composition.

12. The liquid crystal composition according to claim 1, wherein the fourth component is at least one compound selected from the group of compounds represented by the formula (4-1) to (4-2):

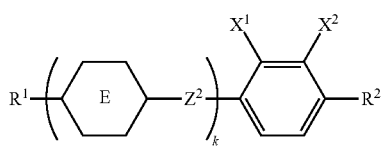
(4-1)

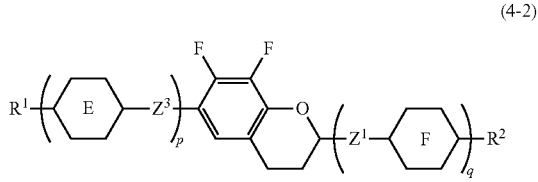
(4-2)

wherein R1 and R2 are each independently alkyl having 1 to 12 carbons, alkoxy having 1 to 12 carbons, alkenyl having 2 to 12 carbons or alkenyl having 2 to 12 carbons; ring E and ring F are each independently 1,4-cyclohexylene or 1,4-phenylene; $Z^1$ and $Z^3$ are each independently a single bond, ethylene, methyleneoxy or carbonyloxy; $Z^2$ is independently a single bond, ethylene or carbonyloxy; $X^1$ and $X^2$ are each independently fluorine or chlorine; k is 1, 2 or 3; p and q are each independently 0, 1, 2 or 3, and the sum of p and q is 3 or less.

13. The liquid crystal composition according to claim 12, wherein the fourth component is at least one compound selected from the group of compounds represented by the formulas (4-1-1) to (4-1-7) and (4-2-1) to (4-2-4):

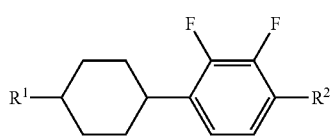
(4-1-1)

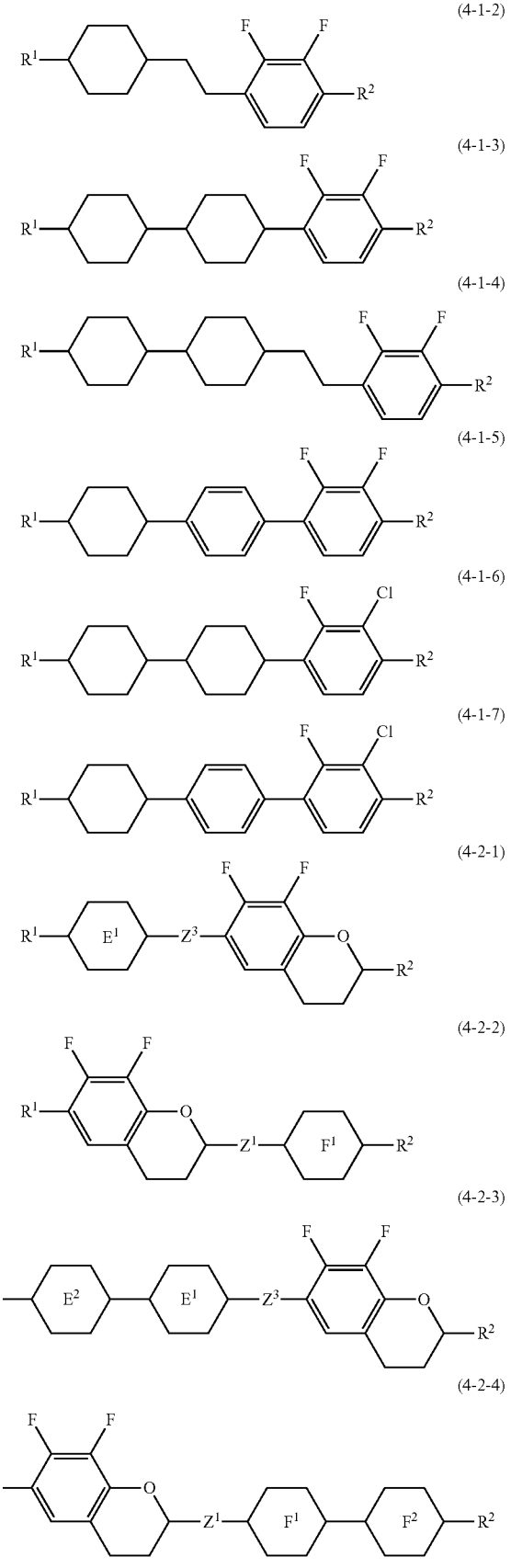

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring $E^1$, ring $E^2$, ring $F^1$ and ring $F^2$ are each independently 1,4-cyclohexylene or 1,4-phenylene; $Z^1$ and $Z^3$ are each independently a single bond, ethylene, methyleneoxy or carbonyloxy.

14. The liquid crystal composition according to claim 12, wherein a ratio of the fourth component is from 5% by weight to 50% by weight, based on the total weight of the liquid crystal composition.

15. The liquid crystal composition according to claim 1, wherein the composition has a maximum temperature of a nematic phase of 70° C. or more, an optical anisotropy (25° C.) at a wavelength of 589 nm of 0.08 or more, and a dielectric anisotropy (25° C.) at a frequency of 1 kHz of −2 or less.

16. A liquid crystal device display that includes the liquid crystal composition according to claim 1.

17. The liquid crystal composition according to claim 16, wherein the liquid crystal display device has an operation mode of a VA mode, an IPS mode or a PSA mode, and has a driving mode of an active matrix mode.

18. The liquid crystal composition according to claim 9, wherein the fourth component is at least one compound selected from the group of compounds represented by the formula (4-1) to (4-2):

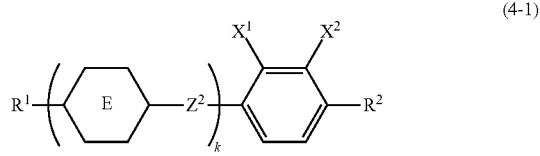

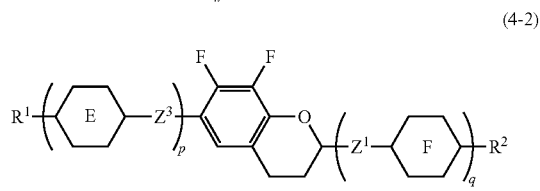

wherein $R^1$ and $R^2$ are each independently alkyl having 1 to 12 carbons, alkoxy having 1 to 12 carbons, alkenyl having 2 to 12 carbons or alkenyl having 2 to 12 carbons; ring E and ring F are each independently 1,4-cyclohexylene or 1,4-phenylene; $Z^1$ and $Z^3$ are each independently a single bond, ethylene, methyleneoxy or carbonyloxy; $Z^2$ is independently a single bond, ethylene or carbonyloxy; $X^1$ and $X^2$ are each independently fluorine or chlorine; k is 1, 2 or 3; p and q are each independently 0, 1, 2 or 3, and the sum of p and q is 3 or less.

19. The liquid crystal composition according to claim 18, wherein the fourth component is at least one compound selected from the group of compounds represented by the formulas (4-1-1) to (4-1-7) and (4-2-1) to (4-2-4):

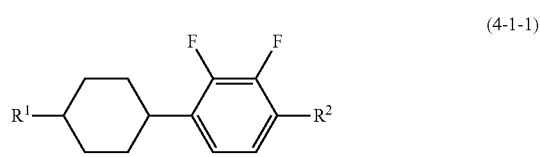

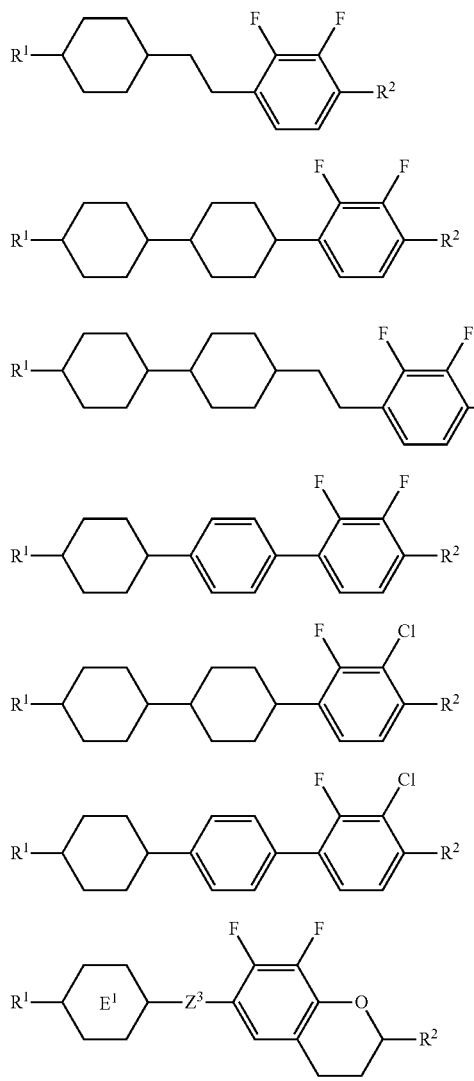
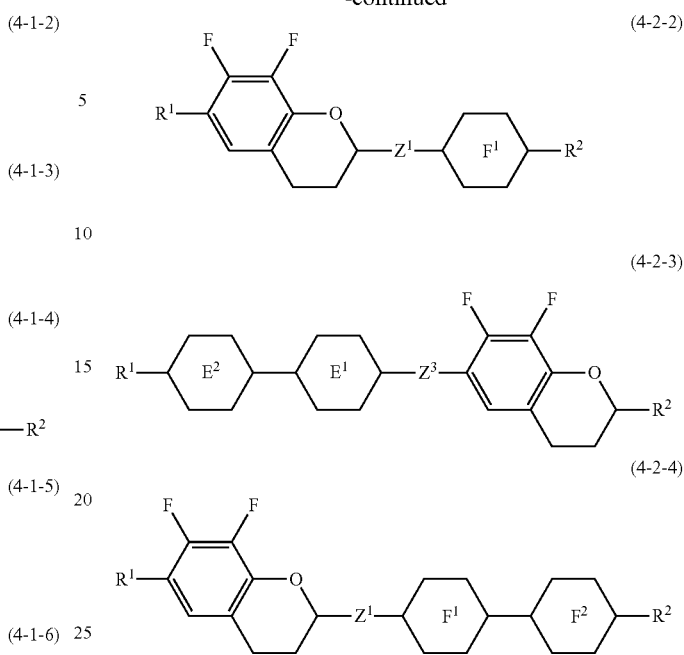

wherein $R^1$ and $R^2$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring $E^1$, ring $E^2$, ring $F^1$ and ring $F^2$ are each independently 1,4-cyclohexylene or 1,4-phenylene; $Z^1$ and $Z^3$ are each independently a single bond, ethylene, methyleneoxy or carbonyloxy.

20. The liquid crystal composition according to claim 18, wherein a ratio of the fourth component is from 5% by weight to 50% by weight, based on the total weight of the liquid crystal composition.

\* \* \* \* \*